United States Patent
Buelow

(10) Patent No.: US 8,761,470 B2
(45) Date of Patent: Jun. 24, 2014

(54) ANALYZING AN AT LEAST THREE-DIMENSIONAL MEDICAL IMAGE

(75) Inventor: Thomas Buelow, Grosshansdorf (DE)

(73) Assignee: Koninklijke Philips N.V., Eindhoven (NL)

(*) Notice: Subject to any disclaimer, the term of this patent is extended or adjusted under 35 U.S.C. 154(b) by 208 days.

(21) Appl. No.: 13/126,203

(22) PCT Filed: Oct. 19, 2009

(86) PCT No.: PCT/IB2009/054589
§ 371 (c)(1),
(2), (4) Date: Apr. 27, 2011

(87) PCT Pub. No.: WO2010/049844
PCT Pub. Date: May 6, 2010

(65) Prior Publication Data
US 2011/0206255 A1 Aug. 25, 2011

(30) Foreign Application Priority Data
Oct. 29, 2008 (EP) .................................. 08167822

(51) Int. Cl.
*G06K 9/00* (2006.01)
(52) U.S. Cl.
USPC ........... 382/128; 382/131; 345/156; 345/589; 345/424; 600/425
(58) Field of Classification Search
USPC .................. 382/128, 131; 345/156, 589, 424; 600/425
See application file for complete search history.

(56) References Cited

U.S. PATENT DOCUMENTS

| | | | |
|---|---|---|---|
| 5,452,367 A | 9/1995 | Bick et al. | |
| 6,119,033 A * | 9/2000 | Spigelman et al. | 600/426 |
| 7,773,791 B2 * | 8/2010 | Simon et al. | 382/128 |
| 2004/0176726 A1 * | 9/2004 | Katoh et al. | 604/164.13 |
| 2004/0240717 A1 * | 12/2004 | Tsujii | 382/128 |

(Continued)

FOREIGN PATENT DOCUMENTS

| | | |
|---|---|---|
| EP | 0647487 A1 | 4/1995 |
| JP | 2005160616 | 6/2005 |

OTHER PUBLICATIONS

Ruey-Feng Chang, Wen-Jie Wu, Woo Kyung Moon, Wei-Ming Chen, Wei Lee and Dar-Ren Chen; "Segmentation of breast tumor in three-dimensional ultrasound images using three-dimensional discrete active contour model", (Ultrasound in Med. & Biol., vol. 29, No. 11, pp. 1571-1581, 2003.).*

(Continued)

*Primary Examiner* — Stephen R Koziol
*Assistant Examiner* — Shaghayegh Azima

(57) ABSTRACT

A system for analyzing an at least three-dimensional medical image comprises a lesion detector (51) for identifying a lesion (4) represented by the image. A surface detector (52) identifies at least part of a surface (5) of an object represented by the image. Means (53) are provided for establishing an orientation of the lesion (4) with respect to at least part of the surface (5), based on an output of the lesion detector (51) and an output of the surface detector (52). A model fitter (54) fits a model (6) to the lesion (4). The means (53) for establishing an orientation of the lesion (4) comprises a lesion orientation detector (56) for computing an orientation value ($\alpha$) indicative of an orientation of the model (6) with respect to at least part of the surface (5).

14 Claims, 5 Drawing Sheets

(56) References Cited

U.S. PATENT DOCUMENTS

| | | | |
|---|---|---|---|
| 2005/0033315 A1* | 2/2005 | Hankins | 606/129 |
| 2007/0149878 A1* | 6/2007 | Hankins | 600/427 |
| 2007/0280525 A1 | 12/2007 | Basilico et al. | |
| 2008/0044074 A1 | 2/2008 | Jerebko et al. | |
| 2008/0226018 A1* | 9/2008 | Partain et al. | 378/4 |
| 2009/0060304 A1* | 3/2009 | Gulfo et al. | 382/128 |
| 2009/0080765 A1* | 3/2009 | Bernard et al. | 382/154 |
| 2009/0175406 A1* | 7/2009 | Zhang et al. | 378/8 |
| 2009/0214092 A1* | 8/2009 | Hirsch et al. | 382/128 |
| 2009/0259122 A1* | 10/2009 | Larson et al. | 600/411 |
| 2010/0069744 A1* | 3/2010 | Simpkin | 600/425 |
| 2010/0150413 A1* | 6/2010 | Futamura | 382/128 |
| 2010/0202673 A1* | 8/2010 | Zhang et al. | 382/128 |
| 2010/0260383 A1* | 10/2010 | Truyen et al. | 382/106 |

OTHER PUBLICATIONS

"Kenneth G. A. Gilhuijsa) and Maryellen L. Giger", "Computerized analysis of breast lesions in three dimensions using dynamic magnetic-resonance imaging", "Med. Phys. 25 „9 . . . , Sep. 1998".*

S. Destounis, S. Hanson, "Computer-aided detection of breast carcinoma in standard mammographic projections with digital mammography" Special Session on Breast CAD, Int J CARS (2007) 2 (Suppl 1):S330-S350 DOI 10.1007/s11548-007-0106-4.*

Dirk O. Watermann, Clemens Tempfer, Lukas A. Hefler, Celine Parat, and Elmar Stickeler, ("Ultrasound morphology of invasive lobular breast cancer is different compared with other types of breast cancer", Ultrasound in Med. & Biol., vol. 31, No. 2, pp. 167-174, 2005).*

"Wei-Chih Shen, Ruey-Feng Chang, Wen-Jie Wu, Woo Kyung Moon", "Computer aided classification system for breast ultrasound based on breast imaging reporting and data system (BI-Rads)", "Ultrasound in Med. & Biol., vol. 33, No. 11, pp. 1688-1698, 2007".*

Sughra Raza, Allison L. Goldkamp, Sona A. Chikarmane, Robyn L. Birdwell, "US of Breast Masses Categorized as BI-RADS 3, 4, and 5: Pictorial Review of Factors Influencing Clinical Management" RadioGraphics 2010; 30:1199-1213.*

Bulow et al: "Segmentation of Suspicious Lesions in Dynamic, Contrast-Enhanced Breast MR Images"; Medical Imaging 2007, Proceedings of SPIE, vol. 6514, pp. 65140T-1-65140T-12.

Sun et al: "A New Approach for Breast Skin-Line Estimation in Mammograms"; Pattern Analysis and Applications, vol. 9, 2007, pp. 34-47.

Sahiner et al: "Computerized Characterization of Breast Masses on Three-Dimensional Ultrasound Volumes", Medical Physics, vol. 31, No. 4, Apr. 2004, pp. 744-754.

Gilhuijs et al: "Computerized Analysis of Breast Lesions in Three Dimensions Using Dynamic Magnetic-Resonance Imaging"; Medical Physics, vol. 25, No. 9, Sep. 1998, pp. 1647-1654.

Juliwati Joe: "Tumor Analysis Using Breast Elastography"; Thesis, National Chung Cheng University, Jan. 1995, pp. 1-43.

Buelow et al: "Robustness of Morphologic Features for the Characterization of Mass Lesions in Dynamic, Contrast-Enhanced Breast MR Images"; Proc. Intl. Soc. Mag. Reson. Med., vol. 16, 2008, p. 562.

* cited by examiner

ANALYZING AN AT LEAST THREE-DIMENSIONAL MEDICAL IMAGE

FIELD OF THE INVENTION

The invention relates to analyzing an at least three-dimensional medical image. The invention further relates to visualizing a lesion represented by an at least three-dimensional medical image.

BACKGROUND OF THE INVENTION

The characterization of mass-like breast lesions is an important step in the workup of diagnostic breast images. Categories for lesion characterization have been defined by the American College of Radiology (ACR) in the "Breast imaging reporting and data system" (Bi-rads). This standard comprises visually assessable lesion features including "shape" and "lesion margin". In addition to these features, modality-specific features are listed, such as kinetic curve assessment in dynamic contrast enhanced MR images.

MR images of breast lesions can be visually inspected using an image viewer. Such an image viewer in many cases allows showing axial slices and multi-planar reformatted slices (MPR). Other visualization modes, such as volume rendering and surface rendering, may also be supplied.

Dynamic contrast enhanced breast MRI has been emerging as a diagnostic tool. Also, there has been a demand for computer aided diagnosis tools for this application. In order to build robust computer-aided detection (CAD) applications yielding understandable and reproducible results, a carefully selected small set of features is preferably used. In the paper "Robustness of Morphologic Features for the Characterization of Mass Lesions in Dynamic, Contrast-Enhanced Breast MR Images", by Th. Buelow et al., ISMRM, 2008, three morphologic features are compared with respect to their robustness against variations in the mass lesion segmentations that are the input to the feature computation step. These features include "Normalized Mean Distance to Surface", "sphericality", and "compactness".

SUMMARY OF THE INVENTION

It would be advantageous to have an improved way of analyzing an at least three-dimensional medical image. To better address this concern, in a first aspect of the invention a system is presented that comprises a surface detector for identifying a portion of a surface of an object represented by the image;

a lesion detector for identifying a lesion comprised in the object and represented by the image; and means for establishing an orientation of the lesion with respect to the portion of the surface, based on an output of the lesion detector and an output of the surface detector.

The system thus defined allows for a new way of analyzing a three-dimensional medical image. In particular, the system allows assessing the orientation of the lesion with respect to at least part of the surface. The inventors have realized that the lesion orientation, which is one of the parameters to be measured when analyzing ultrasound breast images according to the above mentioned Bi-rads standard, could theoretically also be assessed in three-dimensional images such as MR images. This could potentially make the ultrasound acquisition superfluous, at least for assessing lesion orientation, and hence increase the overall efficiency of medical imaging equipment. However, with existing medical analysis tools the lesion orientation cannot be practically assessed, in particular because the orientation of the skin surface, which is a natural reference point in ultrasound images because the position of the ultrasound probe is determined by the skin surface, with respect to an image acquisition apparatus is variable in three-dimensional imaging techniques such as MR and CT. The proposed system automatically identifies at least part of the surface in the medical image by means of the surface detector, which facilitates establishing the orientation of the lesion with respect to at least part of the surface.

The lesion detector may comprise a model fitter for fitting a model to the lesion. This is an efficient way of detecting an object in an image. For example, an adaptive shape model may be used, or a predetermined geometrical model, such as an ellipsoid, may be fitted to the lesion.

The means for establishing an orientation of the lesion may comprise a lesion orientation detector for computing an orientation value indicative of an orientation of the model with respect to the portion of the surface. This orientation value may be presented to a physician. Alternatively or additionally, the orientation value may be provided to a decision support system. The orientation value provides a very compact, reproducible representation of the lesion orientation. The orientation value may be computed fully automatically.

The surface detector may be arranged for selecting a portion of the surface which is substantially closest to the lesion. The orientation established with respect to the portion of the surface closest to the lesion may be the clinically most relevant orientation, as this orientation represents the orientation with respect to the surface behind which the lesion is located. The portion of the surface may comprise or may be a point on the surface. Also, this portion of the surface may correspond to a point on the skin on which an ultrasound device is positioned during an ultrasound examination.

The means for establishing the orientation of the lesion may comprise a view generator for generating a view of the lesion according to a projection plane or intersection plane substantially perpendicular to the part of the surface. The system provides a view of the lesion which is highly suitable for visually assessing the orientation of the lesion in respect of the surface. The projection plane or intersection plane substantially perpendicular to at least part of the surface helps visualizing the orientation of the lesion in respect of the surface.

The view generator may be arranged for generating a multi-planar reformat of the image corresponding to the intersection plane. A multi-planar reformat (MPR) is an oblique slice view of the medical image, as is known in the art. The multi-planar reformat of the image corresponding to the intersection plane substantially perpendicular to at least part of the surface is particularly useful in assessing the lesion orientation with respect to the surface.

The view generator may comprise a three-dimensional scene renderer for rendering a view of the image visualizing at least part of the lesion, a viewing direction of the view being substantially parallel to at least part of the surface. This provides an alternative viewing mode, which provides additional insight into the lesion orientation.

The view generator may be arranged for generating a view in which at least part of the surface substantially coincides with a border of the view. This feature makes the resulting view resemble a clinically relevant ultrasound image more closely, which further facilitates reliable assessment by a clinician of the lesion orientation.

An annotator may be provided for including in the view an annotation indicating a long axis of the lesion. This indication may help to increase confidence in the system, because it visualizes which lesion was detected and what dimension and/or orientation was detected.

The view generator may comprise means for determining the orientation of the projection or intersection plane, based also on an orientation of a model fitted to the lesion by the model fitter. This allows automatic generation of one or more standardized views, each view having, for example, a viewing direction which is determined based on at least part of the surface and the orientation of the lesion. Such standardized views increase efficiency.

The model fitter may comprise means for detecting a longitudinal direction of the lesion. Moreover, the means for establishing an orientation of the lesion may comprise a view generator for generating a view of the lesion according to a projection plane or intersection plane substantially perpendicular to at least part of the surface and substantially parallel to the longitudinal direction of the lesion. This shows a view of the length direction of the lesion with respect to the surface.

The system may comprise a computer aided detection system for classifying the lesion according to clinical relevance. The orientation value may be used as an input to such a computer aided detection system.

The surface may comprise a surface of a breast represented in the image, and the lesion may comprise a breast lesion. For such an application the lesion orientation has particular clinical relevance.

A medical imaging apparatus may comprise the system set forth and an MRI scanner for providing the at least three-dimensional image comprising a representation of the surface and a representation of the lesion. This way, the establishing of the lesion orientation and image acquisition may be performed on the same device, which allows obtaining a result quickly.

A method of analyzing an at least three-dimensional medical image may comprise identifying a portion of a surface of an object represented by the image;

identifying a lesion comprised in the object and represented by the image; and establishing an orientation of the lesion with respect to the portion of the surface, based on an output of the lesion detector and an output of the surface detector.

A computer program product may comprise instructions for causing a computerized system to perform the method set forth.

It will be appreciated by those skilled in the art that two or more of the above-mentioned embodiments, implementations, and/or aspects of the invention may be combined in any way deemed useful.

Modifications and variations of the image acquisition apparatus, of the workstation, of the system, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be further elucidated and described with reference to the drawing, in which.

DETAILED DESCRIPTION OF EMBODIMENTS

The characterization of mass-like breast lesions is an important step in the workup of diagnostic breast images. Categories for lesion characterization have been defined by the American College of Radiology (ACR) in the "Breast imaging reporting and data system" (Bi-rads). The clinically relevant feature "lesion orientation" is only specified in the standard for ultrasound, since in this modality the orientation of the lesion is visually directly assessable. The valuable information that is contained in the lesion orientation information remains unused in breast MR studies since the feature is visually less accessible in volumetric MR images.

However, by computationally extracting the lesion orientation of a mass lesion from 3D MR images, this quantity can be made available to aid the classification of the lesion. The orientation may be presented to the user as a numeric value as well as through automatically selected oblique multi-planar reformatted images (MPR's), which visually clarify the lesion orientation. The orientation assessment, previously only available for ultrasound images, thus becomes available also for MR images.

The systems and methods described in this description can be used as part of a breast CAD system. They can also be used as part of a medical imaging tool. Such CAD systems and medical imaging tools can be implemented, for example, on a dedicated breast MR viewing/CAD workstation, a PACS system, or on the scanner console directly.

Figure 1A:
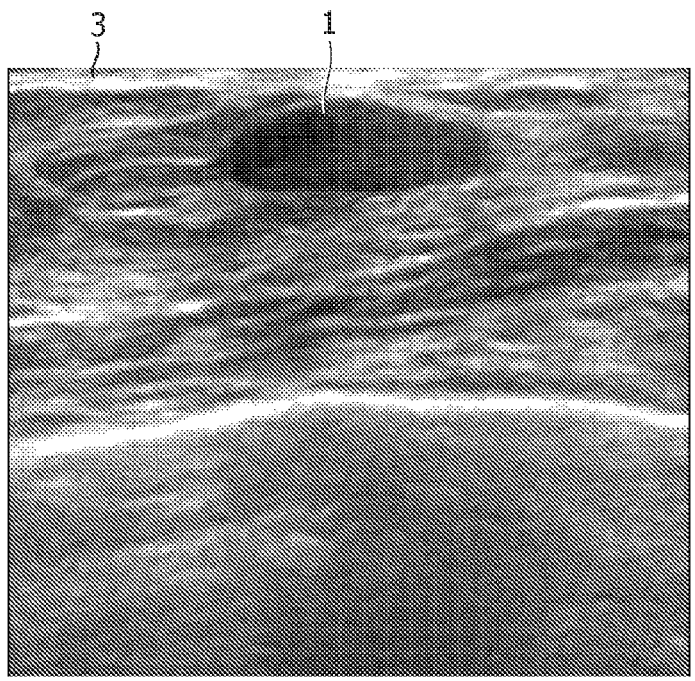
FIG. 1 shows example ultrasound images.
Figure 1B:
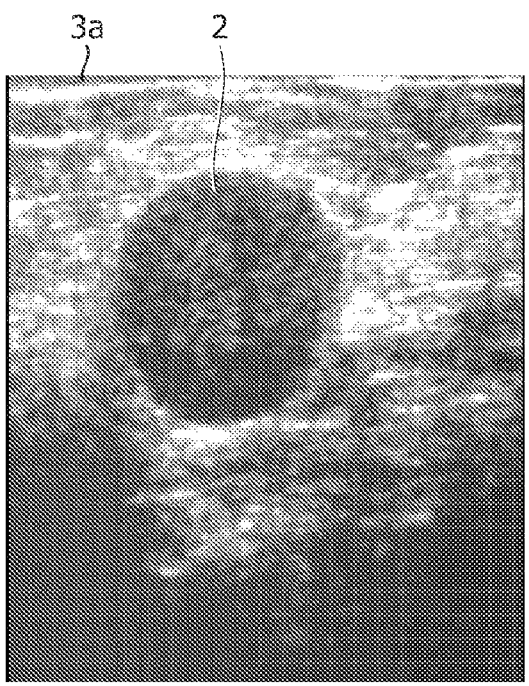

FIG. 1 illustrates two breast ultrasound images of different patients. The upper edge 3 and 3a of each image corresponds to the skin-line. This is where the ultrasound probe was positioned during acquisition. FIG. 1A illustrates an ultrasound image showing a breast lesion 1 which is wider than tall or "parallel". FIG. 1B illustrates an ultrasound image showing a breast lesion 2 which is taller than wide or "not parallel" according to Bi-Rads. In ultrasound imaging, lesion orientation is naturally visible due to the manner in which the image is acquired: using a hand-held probe which is positioned on the skin surface of the breast. Because of this acquisition technique, the lesion is displayed in a fixed orientation with the surface of the breast, which makes visual and/or automated inspection of lesion orientation easy.

One of the reasons why lesion orientation has not been used in clinical practice when analyzing breast MR images is that, from a three-dimensional MR image, the orientation of a lesion with respect to the skin surface is not visible. Consequently, the valuable information that is contained in the lesion orientation information remains unused in breast MR studies since the feature is less accessible in volumetric MR images using current viewing workstations. To overcome this, a method is provided which may help to compute the lesion orientation of a mass lesion from 3D medical images. Also, an oblique MPR that visually presents the medical image information in a way the clinicians know from ultrasound helps clarifying the lesion orientation. Automatic selection of such an oblique MPR may relieve the clinician from manually searching for the lesion in the image.

Figure 2A:
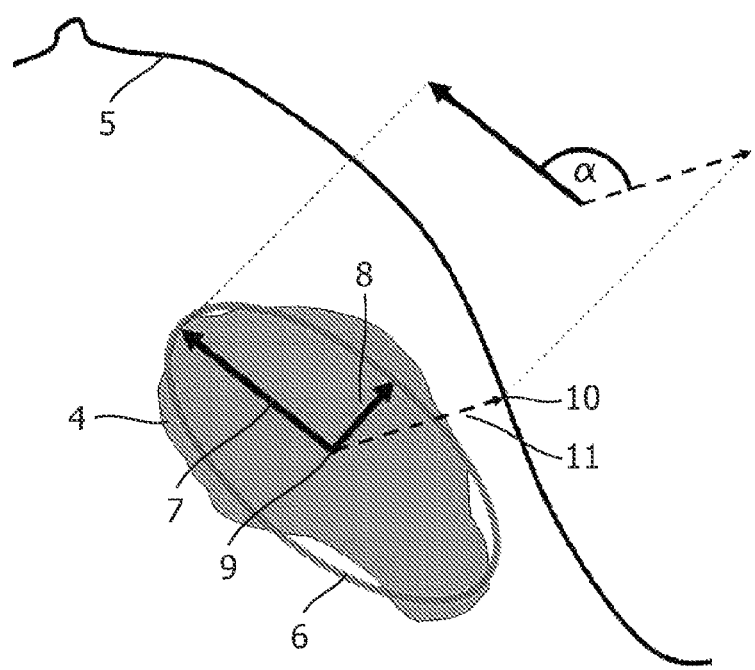
FIG. 2 shows a diagram of a breast lesion in an at least three-dimensional image.

FIG. 2A illustrates schematically a 2D cross sectional slice of a 3D medical image, comprising a lesion 4 and a breast skin surface 5. A number of processing steps may be applied. A mass lesion 4 may be segmented from a dynamic contrast enhanced breast MR image, e.g., as described in "Segmentation of suspicious lesions in dynamic contrast-enhanced breast MR images", by T. Büllow et al., in SPIE Medical Imaging vol. 6514, 2007. However, other segmentation methods may be applied as well. An ellipsoid 6 may be fitted to the segmented mass lesion to find the best-fitting ellipsoid. This may be done by computing the principal axes of inertia of the lesion and selecting an ellipsoid having the corresponding principal axes 7 and 8, a center point 9 of the ellipsoid corresponding to the point of gravity of the lesion, for example. However, the ellipsoid model is only an example. Shape models of mass lesions are known in the art and may be applied here by means of adaptive model based segmentation. Accordingly, the steps of model fitting and segmentation may be combined in a single step. Preferably, a model is used of which a principal axis of inertia can be easily extracted.

The skin surface 5 may be extracted from the medical image, using image processing techniques, such as gradient estimation, known in the art. For example, a contrast enhanced breast MR image may be used. Preferably, the same image is used for both lesion segmentation and skin surface extraction, however it is also possible to use two distinct images which are registered to each other. The skin surface point 10 may be established which is closest to (the center of gravity 9 of) the segmented breast lesion. A numerical value of the degree of parallelism may be computed as the sine of the angle α between the lesion long axes 7 and the direction vector from lesion center to the closest skin surface point 11. Consequently, in this example, the degree of parallelism may take values ranging from 0 to 1, with 0 being used for a perfectly non-parallel lesion and 1 for a parallel lesion.

Figure 2B:
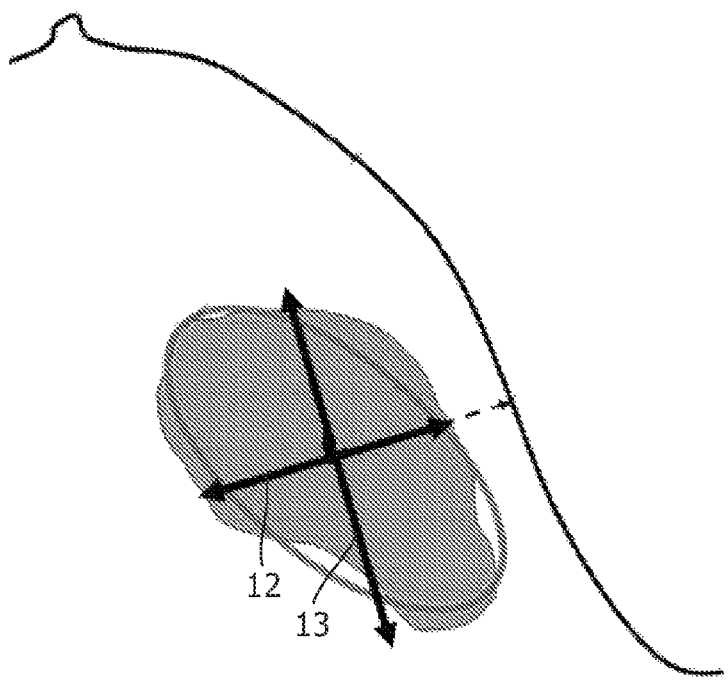

FIG. 2B illustrates an alternative orientation estimation. The height 12 of the lesion in the direction of the closest skin surface point and the width 13 of the lesion in the direction perpendicular to the direction of the closest skin surface point can be computed. These figures, or their ratios, are alternative indications of the orientation of the lesion which may be familiar to the physician. This height and width may be computed in different ways, for example as the height and width of a properly positioned bounding box just large enough to comprise the lesion. Alternatively, it may be computed as the diameter of the ellipsoid in the relevant directions.

In addition to the numerical value indicating the degree of parallelism, one or more oblique MPR's may be presented to the user, for example an MPR for the cross-sectional planes spanned by the direction vector from the lesion to the surface and the longest/shortest axis (one plane each) of the lesion. These views may be reformatted such that the direction vector to the skin surface points upwards in the image plane. This way, the obtained view resembles an ultrasound image because the orientation of the visualized objects is similar to an ultrasound image. This helps to enable a clinician to make a diagnosis based on the image.

Figure 3A:
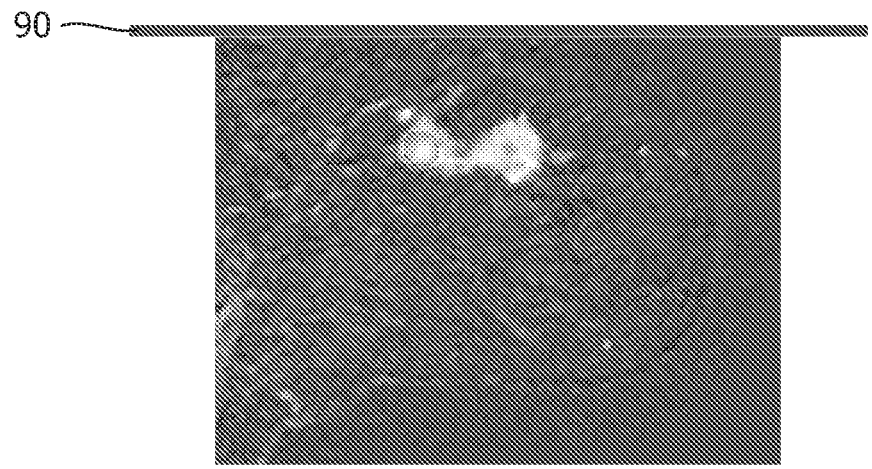
FIG. 3 shows example MR images.
Figure 3B:
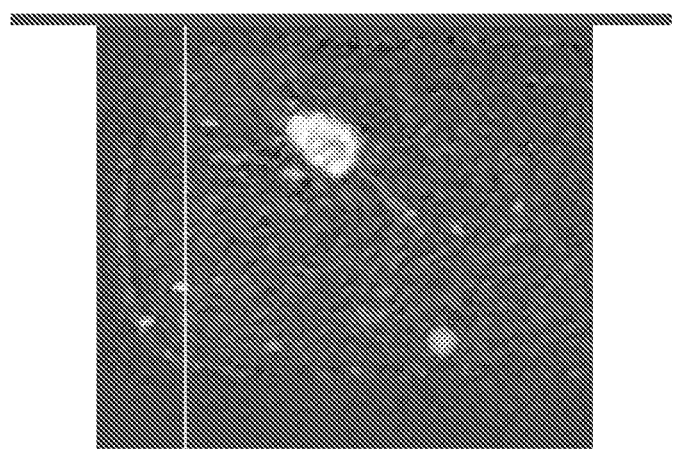

FIG. 3 illustrates two images generated in this way. FIG. 3A shows an MPR for the cross-sectional plane spanned by the direction vector from the lesion to the surface and the longest axis of the lesion. FIG. 3B shows an MPR for the cross-sectional plane spanned by the direction vector from the lesion to the surface and the shortest axis of the lesion. Both FIG. 3A and FIG. 3B are MPRs of a 3D dynamic contrast enhanced MR dataset. The dataset consists of a time series of image volumes, the first of which shows the non-contrasted anatomy. After the acquisition of the first volume image a contrast agent is injected intravenously and a time sequence of image volumes is acquired in order to image the inflow and outflow of the contrast agent. For visual assessment of the lesion morphology it is common to display a difference image constructed by subtraction of the non-contrasted image from one of the contrasted images.

Figure 4:
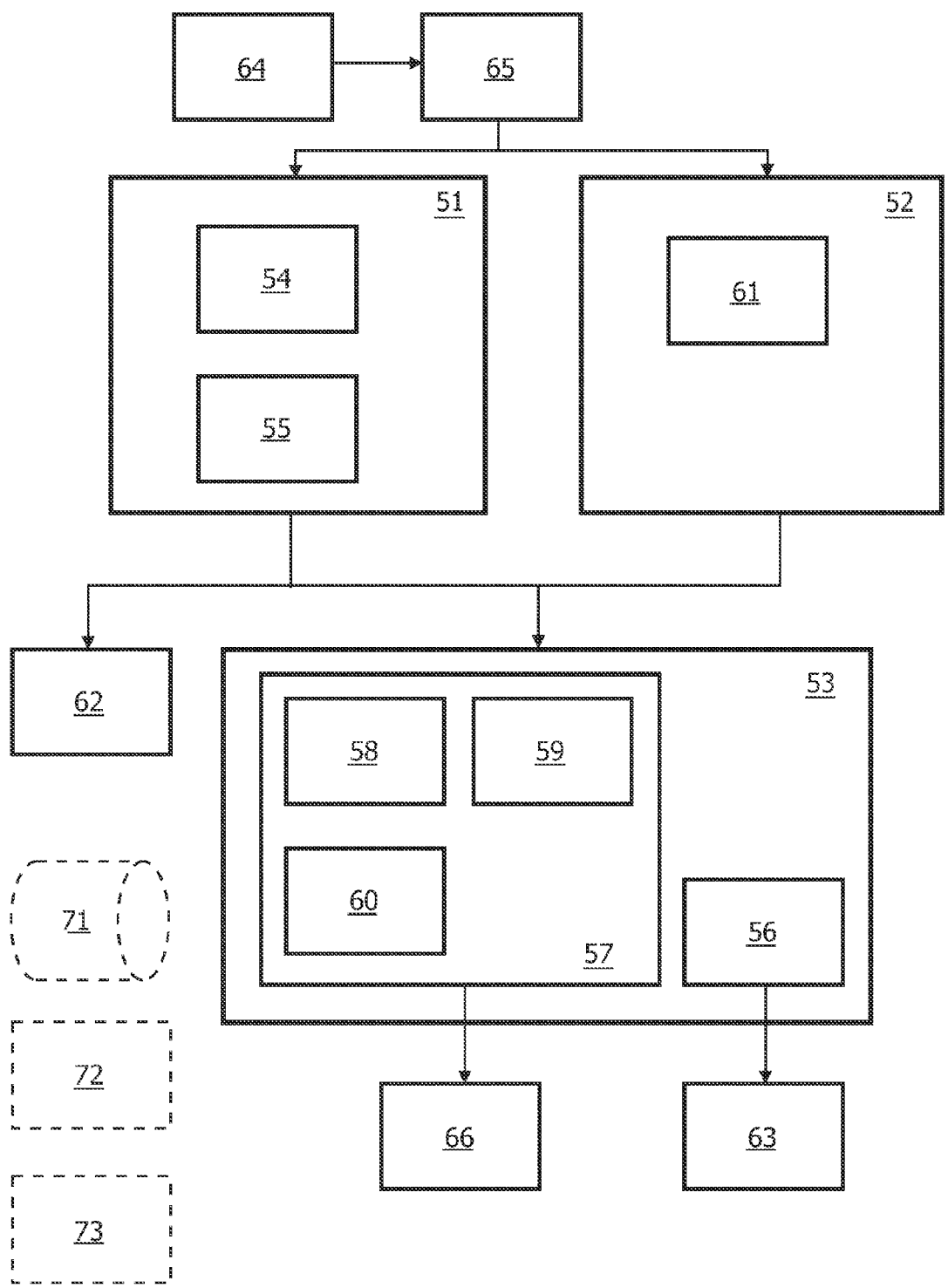
FIG. 4 shows schematically a system for analyzing an at least three-dimensional medical image.
Figure 5:
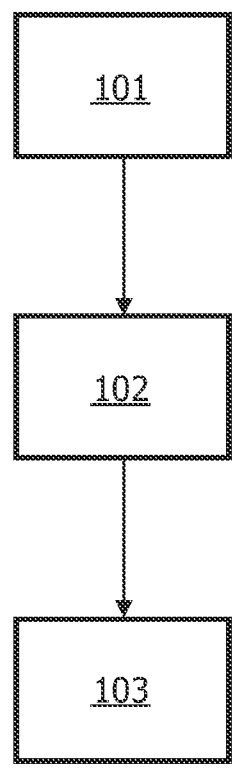
FIG. 5 shows schematically a method of analyzing an at least three-dimensional medical image.

FIG. 4 illustrates schematically a system for analyzing an at least three-dimensional medical image. The blocks shown in FIG. 4 represent system components which may be implemented in many different ways. For example, electronic circuitry could be provided in an integrated circuit (IC), which would perform the functionality as described hereinafter for each component. However, it is also possible to implement some or all of the components completely or in part as software modules, which may be stored in a memory 71. The software modules may comprise computer instructions suitable for being executed by a general purpose processor 72. A control module 73 may be provided for coordinating the execution of the several modules. Such a control module 73 may also take the form of a software module stored in the memory 71 and suitable for being executed by the processor 72. As will be understood by the skilled person, the memory 71 and the processor 72 are hardware units, whereas the other modules of the system may be implemented either in software or in hardware, according to the situation at hand. The memory 71 may also be used for storing image data, received data, intermediate results, and output data. The memory 71 may comprise one or more of a RAM memory, a ROM memory, a flash memory, a magnetic disc, removable media such as CD-ROM, CD-RW, DVD. The processor may comprise a central processing unit as found in a workstation. The control unit 73 may be responsible for initiating the actions of one or more of the individual modules. Alternatively, the modules interact without using the control unit 73. The arrows in FIG. 4 indicate data flow between modules.

An input 65 is provided for receiving medical image data. Such an input may be connected to a medical image scanner 64, such as for example an MRI scanner or a CT scanner or another imaging equipment capable of generating an at least three-dimensional image. Alternatively, the input 65 may be connected to a data server, such as a picture archiving and communications system (not shown) on which data acquired earlier is stored. Data connections may be implemented by means of a network connection such as a LAN or the Internet, for example. Pre-processing means may be provided to perform image pre-processing of data received by the input 65. Such preprocessing may comprise image enhancement techniques, for example, known in the art as such. The image may comprise a plurality of image elements. In case the image is three-dimensional, these image elements are voxels. The image elements have element values associated therewith. Different tissues of the body are usually associated with different image values. This allows for segmentation. Segmentation techniques, known in the art as such, may be applied to localize the different tissues in the body as represented by the image. Additionally or alternatively, isosurfaces may be provided in the image data. Such an isosurface is a surface indicative of locations in the image where the element values are the same. Generating the isosurface from the image elements may be a part of the preprocessing, or it may be part of the functionalities of one or more of the system modules described hereinafter.

A lesion detector 51 may be provided for identifying a lesion 4 represented by the image. The lesion 4 may be detected by using a segmentation technique, such as thresholding or active model segmentation, or indicated by the user using a pointing device like a computer mouse. A segmentation method is described in "Segmentation of suspicious lesions in dynamic contrast-enhanced breast MR images", by T. Büllow et al., SPIE Medical Imaging vol. 6514, 2007.

A surface detector 52 may be provided for identifying at least part of a surface (5) of an object represented by the image. In particular, a portion of the surface may be identified. This surface detection can be performed by using a known segmentation algorithm. For example, if the surface is the skin surface of a patient, the transition from tissue to air may be detected. However, the object could also be an organ comprised in the body, for example.

A means 53 may be provided for establishing an orientation of the lesion 4 with respect to at least part of the surface 5, based on an output of the lesion detector 51 and an output of the surface detector 52. Given the identified lesion and the identified part of the surface, it is easier to establish the orientation of the lesion. As described hereinafter, such an orientation can be established, for example, by means of a suitable view of the surface and the lesion, or by means of further image processing techniques.

Starting with the latter possibility, the lesion detector 51 may comprise a model fitter 54 for fitting a model 6 to the lesion 4. This may be performed by means of adaptive shape modeling, for example. Alternatively, a geometric shape having a few degrees of freedom can be fitted to the lesion. Such a geometric shape could comprise an ellipsoid and the degrees of freedom could include the radii of the ellipsoid as well as the direction vectors of the axes of the ellipsoid. The means 53 for establishing an orientation of the lesion 4 may comprise a lesion orientation detector 56 for computing an orientation value α indicative of an orientation of the model (6) with respect to at least part of the surface (5). For example, such an orientation value α corresponds to an angle between the longitudinal axis of the ellipsoid and the line connecting the center point of the ellipsoid and a point 10 on the surface 5. Instead of the latter line, a vector tangent (or normal) to the surface 5 at a point 10 of the surface 5 could be used. Also, the height and width of the lesion could be used as orientation values.

The surface detector 52 may comprise a surface point selector 61 for selecting a point 10 on the surface 5 substantially closest to the lesion 4. For example, the distance from the lesion (e.g. the center of the lesion) to each of a plurality of points on the surface 5 is computed, and the point corresponding to the smallest distance is chosen as the substantially closest point 10. A numerical optimization algorithm may be used for this. The means 53 for establishing an orientation of the lesion 4 may be arranged for establishing the orientation of the lesion 4 with respect to the point 10 on the surface 5 closest to the lesion 4. For example, the orientation value α may be computed in respect of the substantially closest point 10. The lesion detector 51 may be arranged for detecting a lesion inside the object detected by the surface detector 52. For example, the object may comprise a body, and the lesion may be comprised in the body.

The means 53 for establishing the orientation of the lesion 4 may comprise a view generator 57 for generating a view of the lesion 4 according to a projection plane or intersection plane substantially perpendicular to at least part of the surface. Such a projection or intersection plane provides a view more or less along the surface; this allows an observer such as a clinician to compare the orientation of the lesion with the orientation of the surface. In such a way, the observer can visually assess the orientation and make a guess of the orientation value α.

The view generator 57 may comprise a multi-planar reformat generator 58. This multi-planet reformat generator 58 is arranged for generating a multi-planar reformat of the image corresponding to the intersection plane. This results in a cross sectional slice view of at least part of the image, wherein the intersection plane defines the cross sectional slice.

Alternatively or additionally, the view generator 57 may comprise a three-dimensional scene renderer 59. Such a scene renderer 59 may be based on direct volume rendering techniques such as ray-casting for example, or the scene renderer 59 may be arranged for surface rendering of one or more surfaces which may have been generated in the preprocessing stage or by the scene renderer 59 itself The scene renderer 59 may be arranged for rendering a view of the image visualizing at least part of the lesion 4, a viewing direction of the view being substantially parallel to at least part of the surface 5.

The view generator 57 may be arranged for generating a view in which at least part of the surface 5 substantially coincides with a border 90 of the view. The border 90 of the view corresponds to a side of the view. For example, if the view is displayed in a window on a display, the border of the view may correspond to a side of the window. If the view is displayed full screen, the border of the view may correspond to a side of the screen. The image may need to be rotated and/or translated such that the surface coincides with the border of the view.

An annotator 62 may be provided for including in the view an annotation indicating a long axis of the lesion. Such a long axis very clearly identifies the orientation of the lesion. It is also possible to include annotations of the ellipsoid, and/or of the measured orientation value α. Other annotations, such as an output of a clinical decision support system, may also be provided Annotations may be displayed on a screen, printed, or stored in an electronic patient file.

As discussed above, the lesion detector 51 may comprise a model fitter 54 for fitting a model 6 to the lesion 4. Moreover, the view generator 57 may comprise means 60 for determining the orientation of the projection plane or intersection plane, based on an orientation of the model 6 fitted to the lesion 4 and on at least part of the surface 5. The model may have one or more direction vectors associated with it, for example a direction vector corresponding to the principal axis of an ellipsoid, if the model comprises an ellipsoid. The means 60 may be arranged for adjusting the projection/intersection plane such that said plane has a predetermined orientation with respect to one or more of the direction vectors of the model. This allows generating reproducible views.

The model fitter 54 may comprise a direction detector for identifying a longitudinal direction 7 of the lesion 4 (such as the principal axis of an ellipsoid). The view generator 57 may be arranged for generating a view of the lesion 4 according to a projection plane or intersection plane substantially perpendicular to at least part of the surface 5 and substantially parallel to the longitudinal direction 7 of the lesion 4. This way the longitudinal axis of the lesion is visualized well in relation to the surface.

The output of the means 53 for establishing an orientation of the lesion 4 can comprise one or more orientation values α and/or one or more suitable views of the lesion (for example an MPR showing the lesion and/or the surface in a way described above). This output may be provided to a computer aided detection system 63 or a clinical decision support system for classifying the lesion 4 according to clinical relevance, based on the orientation of the lesion 4 in respect of at least part of the surface 5. Other parameters relating to the lesion may be used in the classification as well. The computer aided detection system 63 may be arranged for classifying the lesion as a benign lesion or a malicious lesion. For example, if the height 12 is smaller than the width 13, this may be used by the computer aided detection system 63 as an indicator of a benign lesion. On the other hand, if the height 12 is larger than the width 13, this may be used by the computer aided detection system 63 as an indicator of a malignant lesion.

The system described herein may be arranged specifically for processing breast images. In such a case, surface 5 may comprise a skin surface of a breast represented in the image (for example a transition between skin tissue and air), and the lesion 4 may comprise a breast lesion, for example a mass lesion, which may be either malicious or benign.

A method of analyzing an at least three-dimensional medical image may comprise a step of identifying 101 a lesion 4 represented by the image; a step of identifying 102 at least part of a surface 5 of an object represented by the image; and a step of establishing 103 an orientation of the lesion 4 with respect to at least part of the surface 5, based on an output of the lesion detector 51 and an output of the surface detector 52.

It will be appreciated that the invention also extends to computer programs, particularly computer programs on or in a carrier, adapted for putting the invention into practice. The program may be in the form of a source code, an object code, a code intermediate source and object code such as a partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system comprising
a memory storing a set of instructions; and
a processor executing the set of instructions to perform operations comprising:
identifying a portion of a surface of an object represented by an at least three dimensional medical image wherein the portion of the surface is identified based on a relationship with a lesion;
identifying the lesion disposed below the surface of the object and represented by the image; and
establishing an orientation of the lesion with respect to the portion of the surface, based on the identification of the lesion and the portion of the surface, wherein the establishing the orientation of the lesion comprises generating a view of the lesion according to a projection plane or intersection plane perpendicular to the portion of the surface.

2. The system of claim 1, wherein the identification of the lesion for comprises fitting a model to the lesion and the establishing the orientation of the lesion comprises computing an orientation value indicative of an orientation of the model with respect to the portion of the surface.

3. The system of claim 1, wherein the identifying the portion of the surface comprises selecting the portion of the surface substantially closest to the lesion.

4. The system of claim 1, wherein the generating the view comprises generating a multi-planar reformat of the image corresponding to the intersection plane.

5. The system of claim 1, wherein the generating the view comprises rendering a view of the image visualizing at least part of the lesion, a viewing direction of the view being parallel to the portion of the surface.

6. The system of claim 1, wherein the generating the view comprises generating a view in which the portion of the surface coincides with a border of the view.

7. The system of claim 1, wherein the generating the view further comprises including in the view an annotation indicating a long axis of the lesion.

8. The system of claim 1, wherein identifying the lesion comprises fitting a model to the lesion, and wherein generating the view comprises determining the orientation of the projection or intersection plane, based on an orientation of the model fitted to the lesion and on the portion of the surface.

9. The system of claim 8, wherein fitting the model comprises identifying a longitudinal direction of the lesion, and wherein generating the view comprises generating the view of the lesion according to a projection plane or intersection plane perpendicular to the portion of the surface and parallel to the longitudinal direction of the lesion.

10. The system of claim 2, wherein the operations further comprise classifying the lesion according to clinical relevance, based on the orientation value.

11. The system of claim 1, wherein the surface comprises a surface of a breast represented in the image, and the lesion comprises a breast lesion.

12. A medical imaging apparatus comprising the system of claim 1 and a medical image scanner providing the at least three-dimensional image.

13. A method of analyzing an at least three-dimensional medical image, comprising
- identifying a portion of a surface of an object and represented by the image wherein the portion of the surface is identified based on a relationship with a lesion;
- identifying the lesion disposed below the surface of the object and represented by the image; and
- establishing an orientation of the lesion with respect to the portion of the surface, based on an output of the lesion detector and an output of the surface detector, wherein the establishing the orientation of the lesion comprises generating a view of the lesion according to a projection plane or intersection plane perpendicular to the portion of the surface.

14. A non-transitory computer program product comprising instructions for causing a computerized system to perform the method according to claim 13.

\* \* \* \* \*